United States Patent Office 2,831,412
Patented Apr. 22, 1958

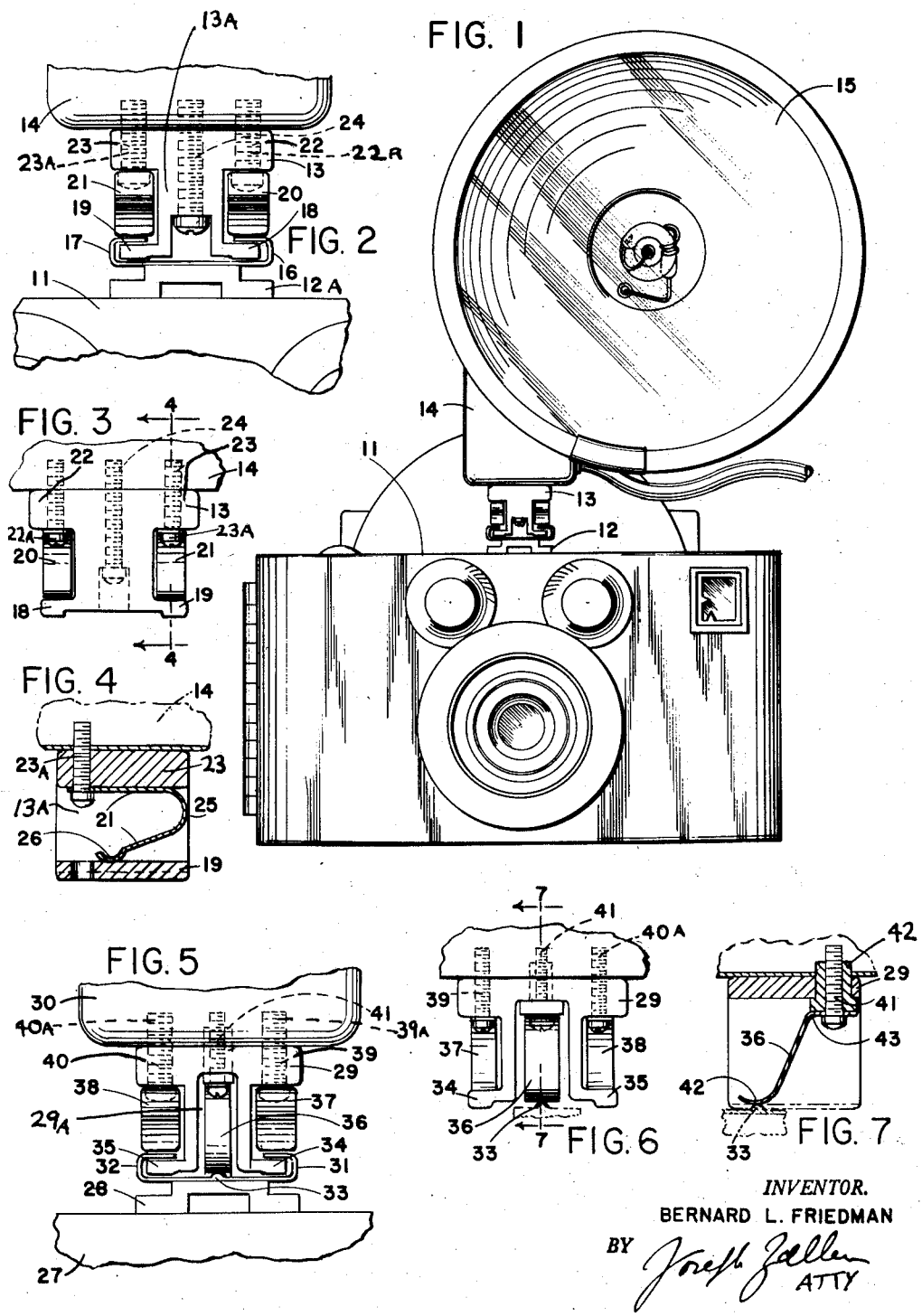

2,831,412
UNIVERSAL BRACKET FOR CAMERAS
Bernard L. Friedman, Natick, Mass.
Application April 19, 1954, Serial No. 423,973
1 Claim. (Cl. 95—11.5)

This invention relates to brackets for attaching auxiliary devices to cameras. In particular, it relates to a flash-lamp which can be attached to a large number of cameras.

The common method of attaching auxiliary devices to cameras is to provide a receiving clip on the camera, which clip has a guideway cooperable with the slidable bracket on the auxiliary device. An exact fit is normally required to prevent dislodging of the device.

The requirement of an exact fit, however, severely limits the types and makes of flash devices that can be used with any particular camera. In other words, since camera manufacturers make receiving clips of various sizes, only a flash lamp having exactly the right size bracket can be used with a particular camera.

In addition to mechanically attaching the device to the camera the bracket-clip engagement is often used to complete a circuit serving to actuate the flash device simultaneously with the operation of the camera. Exact fit is thus normally important in order to provide good contact between the circuit points in the camera clip and the circuit points in the bracket.

In accordance with this invention, a slidable flash lamp bracket is provided which will fit snugly in the camera attachment clip, generally independently of the size of such clips. In addition, a flash lamp bracket is provided having universality of fit as just described and also having a flash-lamp circuit connecting means for cooperation with cameras having circuit connecting means in their clips.

This invention is best described by reference to preferred embodiments illustrated in the drawings, wherein Figure 1 is a frontal view of a flash lamp slidably engaged by its universal bracket in the channeled clip of a camera.

Figure 2 is an enlarged view of a portion of Figure 1 illustrating more clearly the details of the bracket-clip engagement.

Figure 3 is a back view of the bracket in Figure 2.

Figure 4 is a transverse section along line 4—4 of Figure 3.

Figure 5 is a partial frontal view of a bracket-clip engagement wherein circuit connections are also made.

Figure 6 is a rear view of the bracket in Figure 5.

Figure 7 is a sectional view through line 7—7 of Figure 6.

Referring now to Figures 1-4, there is shown a camera 11 equipped with a receiving clip 12, on its upper surface. This receiving clip has a support portion 12A, an open central portion 12B and two opposed lateral channels 16 and 17 open on ends and on the inside. Such a clip can also be formed from a single flat piece of metal cut to appropriate size, by twice bending the side portions to form the channels and provide the open central portion.

The flash lamp 15 is mounted on a support boss 14 to which the mounting bracket 13 is attached. The mounting bracket 13 comprises a central body portion 13A cooperably movable between channels 16 and 17; two lateral bottom extensions 18 and 19 cooperably protruding into the channels 16 and 17 and slidably movable therein; and lateral top extensions 22 and 23. On the bottom of the extensions 22 and 23 are mounted the terminal portions of bent springs 20 and 21, by means of bolts 22A, 23A which with the bolt 24 also serve to attach the bracket to the boss. When the bracket 13 is slid into the clip 11 the open ends of its springs 20 and 21 press upon the top portion of channels 16 and 17 while its bottom lateral extensions 18 and 19 are somewhat within these channels.

It is an important feature of this invention that the lateral extensions 18 and 19 need not be exactly or frictionally fitted into the channels as required by the prior art. The only requirement is that these extensions be of sufficient thickness and protrude sufficiently far into the channels to prevent removal except by forward or rearward sliding. By choosing a total bracket width intermediate the common range of internal width of the clips used on various cameras, the bracket of this invention can be universal.

The required rigidity of attachment is provided by the free ends of the springs 20 and 21 which are located so as to have bearing force upon the top portions of channels 16 and 17. The springs shown are preferred because of their great bearing force achieved by having one portion, including the terminal mounting, flat against the top lateral extension, a portion 25 bent back, and a free end 26 in contact with the tops of the channels.

In the embodiment illustrated in Figures 5, 6 and 7 the mechanical sliding attachment is similar to the previous embodiment. In this embodiment, however, means are provided for direct electrical contact between the bracket and the camera. The camera 27 is equipped with a clip 28 having lateral open channels 31 and 32. In the center of the receiving guideway of the clip is a terminal 33 which is connected to a circuit responsive to the action of the camera shutter. Proper connection of this terminal to a flash lamp circuit can serve to provide simultaneous flashing with the operation of the camera shutter. Such a circuit is described, for example, in United States Patent No. 2,277,233.

The flash lamp bracket 29 comprises an under-recessed central portion 29A slidable between the channels 31 and 32 of the clip. The bracket has upper lateral extensions 39 and 40, and lower lateral extensions 34 and 35. The upper extension supports springs 37 and 38 by means of side bolts 39A and 40A, which with central bolt 41 serve as a means for attaching the bracket to the boss 30. As in the previous embodiment, the extensions 34 and 35 are slidable within channels 31 and 32.

The embodiment illustrated in Figures 5, 6 and 7 is structurally distinguishable from the previous embodiment by having an S-shaped spring 36 spaced within the under recess of central portion 29A and attached to the bracket with bolt 41. The free end of the spring 36 acts to contact terminal 33. An insulating sleeve 42 is provided around bolt 41 so that a non-shorting electrical path exists from the free end of spring 36 to the head of the bolt 41 and through to the end of bolt 41. A flash-lamp conductor (not shown) insulatingly inserted through the boss 30 to the end of the bolt 41 complete an insulated conducting path, which cooperating with button 33 and the flash-lamp circuit can provide the path for simultaneous energizing of the lamp with the shutter action of the camera.

It can, therefore, be seen that this invention provides an essentially universal bracket for firm attachment of accessory devices to cameras, including brackets whose engagement is also intended to complete an electrical circuit.

I claim:

The combination of a camera accessory and a bracket detachably mountable on a camera containing affixed thereto a receiving guideway having an open central portion and two opposing open-end and open-sided lateral channels; said bracket comprising a top portion adapted to be attached to said accessory by at least one metal bolt means protected by an insulating sleeve, a central body portion having a lower undercut recess into which the head of said bolt protrudes and adapted to move between said camera channels, two lateral bottom extensions adapted to be slideable within said camera channels, and two spring members having free ends normally pressing upon said bottom extensions and adapted to be displaceable therefrom by said camera channels upon engagement of said bracket within said guideway; a metal spring member being spaced within said recess and having one end attached to the head of said bolt and its free end being adapted to extend below said bracket.

References Cited in the file of this patent

UNITED STATES PATENTS

| | | |
|---|---|---|
| 1,252,207 | Walker | Jan. 1, 1918 |
| 1,423,590 | Zimmerman | July 25, 1922 |
| 2,176,972 | Lindahl | Oct. 24, 1939 |

OTHER REFERENCES

Ser. No. 323,200, Kuppenbender et al. (A. P. C.), published May 4, 1943.